Sept. 22, 1970　　　　　　　C. F. DOLAN　　　　　　　3,529,487
TRANSMISSION CONTROL DEVICE
Filed Dec. 18, 1968　　　　　　　　　　　　　　　　3 Sheets-Sheet 1
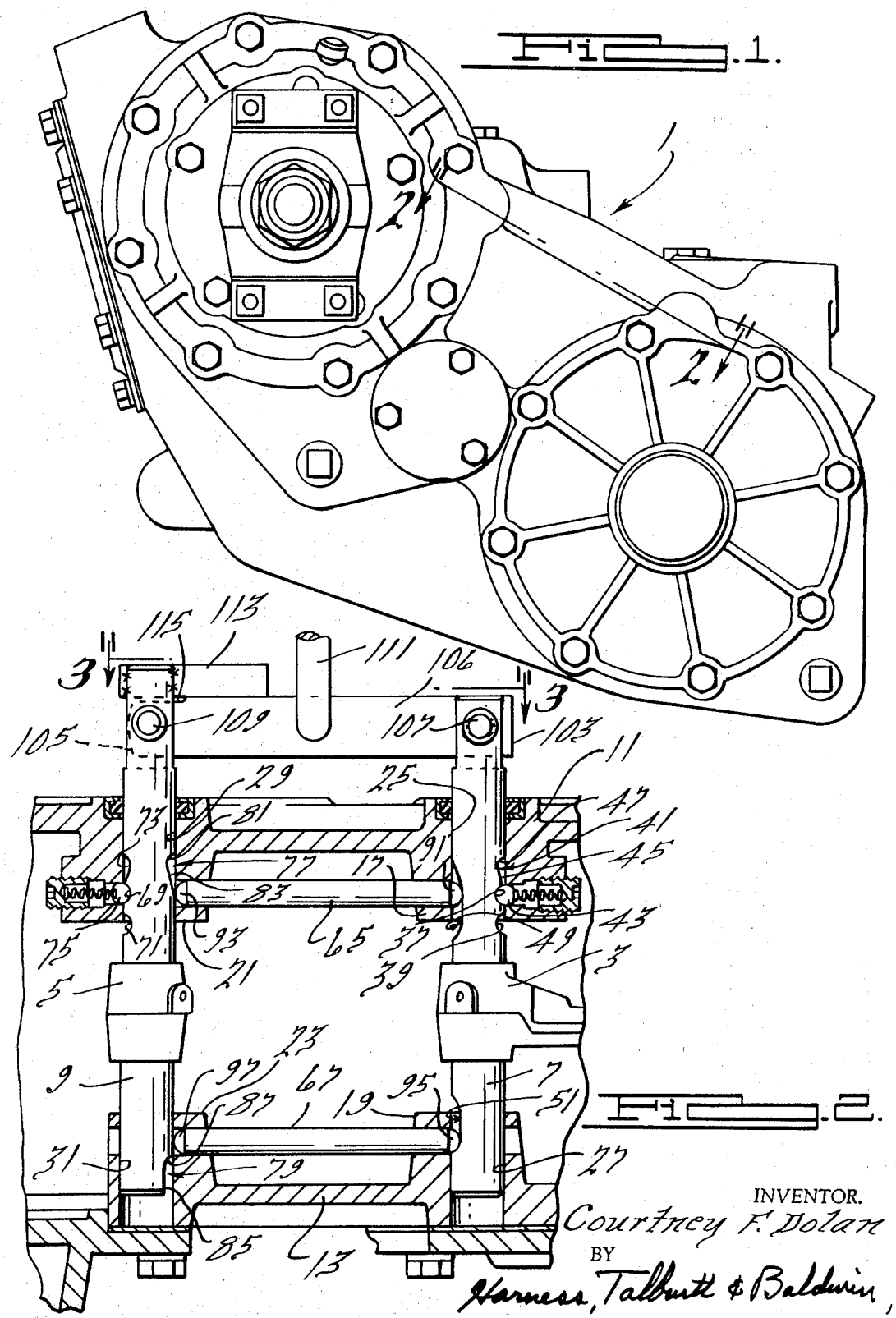
INVENTOR.
Courtney F. Dolan
BY
Harness, Talbutt & Baldwin,
ATTORNEYS.

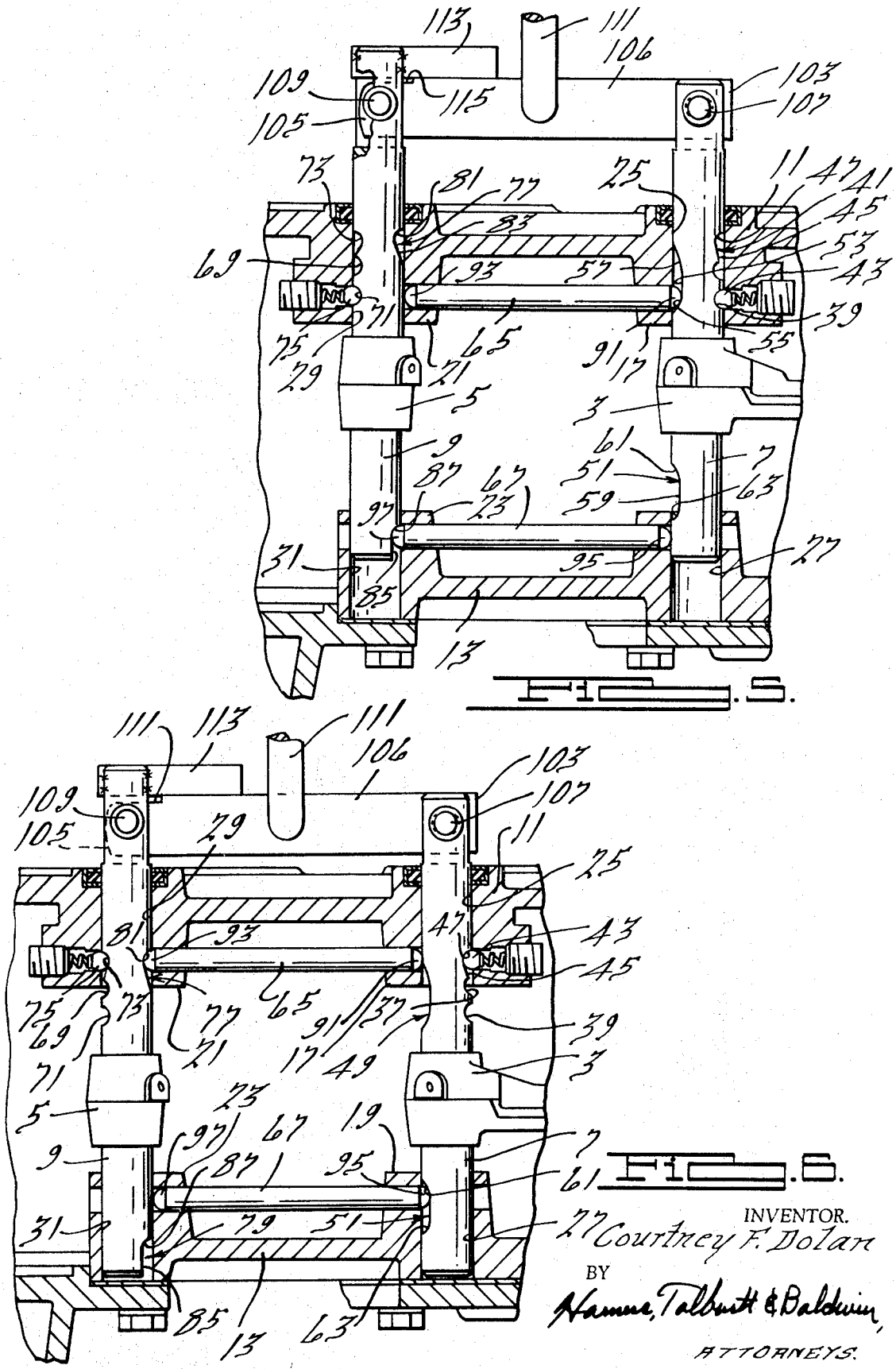

United States Patent Office 3,529,487
Patented Sept. 22, 1970

3,529,487
TRANSMISSION CONTROL DEVICE
Courtney F. Dolan, Syracuse, N.Y., assignor to Chrysler Corporation, Highland Park, Mich., a corporation of Delaware
Filed Dec. 18, 1968, Ser. No. 784,691
Int. Cl. G05g 5/10
U.S. Cl. 74—477
12 Claims

ABSTRACT OF THE DISCLOSURE

Control device for a transmission mechanism including two parallel rails movable between neutral, high and low range positions. Interlock pins extend between the rails. A link connects the two rails, and an arm on one rail engages the link to prevent pivotal movement of the link in one direction beyond a predetermined position relative to the one rail so that both rails will be moved together into a low range position.

BACKGROUND OF THE INVENTION

This invention relates to vehicle transmissions, and more particularly to a control device for controlling the operation of a transmission of the type used for driving a vehicle in either two or four wheel drive.

Vehicles adapted to be driven at varying speeds in two or four wheel drive condition usually have transmissions which include two movable gears for controlling the drive to the wheels, one gear controlling the drive to the front wheels, while the other gear controls the drive to the rear wheels. Gear control rails are provided to control the movement of the gears. The rails are operatively connected to a shift lever adapted to be operated by the driver of the vehicle.

The prior art teaches the use of a single shift lever for controlling the operation and movement of both shift or control rails. The lever is connected to the rails in such a manner that movement of the former causes movement of the rails either independently of or in unison with one another to the various drive positions. Since each rail controls the drive to a different set of wheels, it is possible, in some prior art constructions, to obtain a two wheel low range or drive position, a neutral position, a four wheel low range position and a four wheel high range position. However, a two wheel low range drive condition, i.e. when the rear wheels are driven in the low range, causes an excessive load to be placed on the rear axle components. Accordingly, it is desirable that the two wheel low range position be bypassed when shifting from neutral to four wheel low range position. Normally, the driver had to shift through the two wheel low position to arrive at the four wheel low position. To aid the driver in shifting from neutral to the four wheel low range position, certain prior art devices employed a signal which alerted the driver that the transmission was in the four wheel drive position. This type of arrangement is not altogether satisfactory, since the driver could inadvertently place the transmission in the two wheel low range position, particularly if the signalling device became inoperative. More recently, mechanisms have been employed which prevent the possibility of a two wheel low range condition from being attained. In such devices, it was necessary to move the shift lever in two different planes in shifting from neutral to four wheel low position. Moreover, the mechanism included a relatively complicated linkage arrangement to prevent the two wheel low range position from being obtained. The present invention overcomes some of the difficulties encountered in prior known arrangements.

SUMMARY OF THE INVENTION

Briefly, this invention comprises a pair of shiftable control rails, means to control shifting of such rails sequential from a neutral and a high range condition, and means for causing both rails to be shifted together to a low range condition.

One of the primary objects of this invention is to provide a transmission control device which prevents a two wheel low range condition from being attained.

Another object of this invention is to provide a device of the type described which permits movement of the shift lever in a single plane in shifting between four wheel low, neutral, two wheel high and four wheel high ranges.

Still another object of the present invention is to provide a device of the class described which is economical in construction and effective in operation.

Other objects and advantages of this invention will be made apparent as the description progresses.

BRIEF DESCRIPTION OF THE DRAWINGS

Referring now to the drawings, in which one of various possible inventions is illustrated,
FIG. 1 is an elevation of a transfer case having a transmission control device of this invention thereon;
FIG. 2 is a section taken along line 2—2 of FIG. 1.

Like parts are shown by corresponding reference characters throughout the specification.

DESCRIPTION OF THE PREFERRED EMBODIMENT

Figure 3:
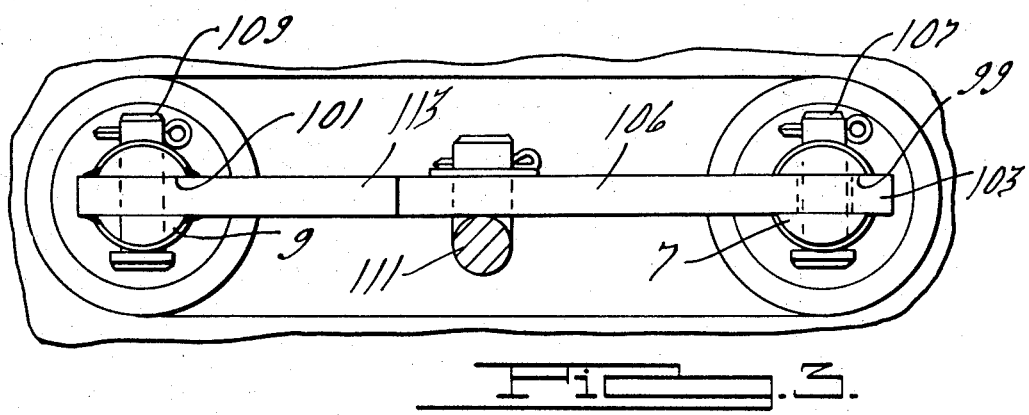
FIG. 3 is a section taken along line 3—3 of FIG. 2, and
FIGS. 4, 5 and 6 are sections similar to FIG. 2 showing the device in different operative positions.

Referring now to the drawings, a transfer case of a transmission is generally shown at 1. The transfer case is of a well-known type and has customary gearing therein for placing the transmission in various drive conditions. In particular, the transfer case includes one gear (not shown) movable to positions for placing the rear wheels in a neutral, high or low range condition, and a second gear (not shown) movable to positions for placing the front wheels in neutral, high or low range condition. As set forth above, it is desirable that the rear wheels are not placed in two wheel low range condition unless the front wheels are substantially simultaneously placed in a two wheel low range condition.

The gears in the transfer case 1 are adapted to be moved between various drive positions by yokes 3 and 5 mounted on rails 7 and 9. Rail 7 may be referred to as the front wheel rail and rail 9 may be referred to as the rear wheel rail.

Figure 4:
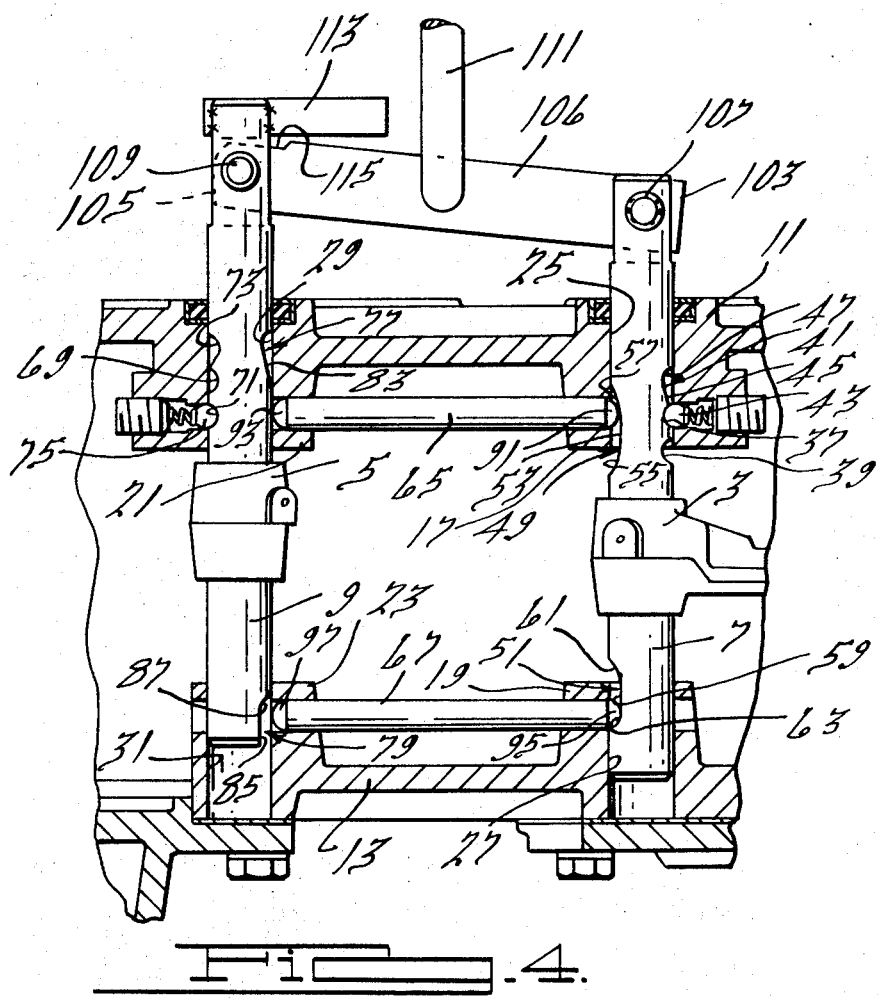

The yoke 3, upon movement of rail 7 from the position shown in FIG. 2 to the position shown in FIG. 5 is adapted to shift a gear (not shown) from a neutral position to a position wherein the front wheels are placed in a high drive range. When the yoke 3 and rail 7 are moved from the FIG. 2 position to the FIG. 6 position, the front wheels are placed in low drive range. When rail 9 and yoke 5 are moved from the FIG. 2 neutral position to the FIGS. 4 and 5 position, the rear wheels are placed in high drive range, and when moved to the FIG. 6 position, the rear wheels are placed in low drive range. The yokes 3 and 5 and the gearing shifted upon movement of the former are well-known and further description is not believed necessary.

The apparatus of this invention permits the rear wheel rail 9 to be moved into low range position only when the front wheel rail 7 is moved into low range position at the same time. The rails are mounted for parallel sliding movement in side walls 11 and 13 of the housing 15. Walls 11 and 13 have inwardly extending enlarged portions or bosses 17, 19, 21 and 23 having bores 25, 27, 29 and 31, respectively, through which rails 7 and 9 pass. Oil seals 33 and 35 are provided in wall 11 around rails 7 and 9.

Rail 7 has three detent notches or recesses 37, 39 and 41 into which a detent 43 in enlarged portion 17 is adapted to be resiliently seated. Recess 37 is a neutral position recess, while recess 39 is a high drive recess, and recess 41 is a low drive recess. Recesses 37 and 39 are curved and preferably substantially semicylindrical or semispherical while recess 41 has a ramp portion 45 connected to a curved portion 47.

On the side of rail 7 towards rail 9 there are provided two interlocking recesses 49 and 51. Recess 49 is elongated and includes a generally straight bottom portion 53 having a length approximately equal to the distance rail 7 moves between neutral position (FIG. 2) and the high range position (FIG. 5). At what may be referred to as the rearward end of portion 53, the lower end as viewed in FIG. 2, recess 49 is provided with a terminating curved portion 55. The recess 49 at the forward end of straight portion 53, is formed as an inclined camming or ramp portion 57. The combined length of ramp 57 and straight portion 53 is approximately equal to the distance rail 7 moves between low and high ranges positions.

Recess 51 includes a straight central portion 59 and curved end portions 61 and 63. The length of central portion 59 is approximately equal to the distance rail 7 travels in moving between low range position and neutral position. It will be noted that recess 49 is adapted to move into and out of bore 25 in enlarged portion 17, while recess 51 is adapted to move into and out of bore 27 in enlarged portion 19. As will be made apparent, interlock pins 65 and 67 are adapted to be moved into and out of recesses 49 and 51 upon movement of rails 7 and 9.

Rail 9 has three detent recesses or notches 69, 71 and 73 into which a detent 75 is adapted to be resiliently seated. Recess 69 is a neutral position recess, while recess 71 is a high drive recess and recess 73 is a low drive recess. Recesses 69, 71 and 73 are of substantially the same shape as recesses 37, 39 and 41, respectively.

On the side of rail 9 toward rail 7 there are two elongated interlocking recesses 77 and 79. Recess 77 includes a curved terminating portion 81 and a rearwardly extending inclined camming or ramp portion 83. Ramp 83 is substantially equal in length and parallel to ramp 57 of recess 49.

Recess 79 is located at the end of rail 9 and includes an elongated portion 85 and a terminating forward curved end portion 87. The interlocking pins 65 and 67 extend between rails 7 and 9 and pass through bores 89 in enlarged portions 17, 19, 21 and 25. The ends of pins 65 and 67 are curved and adapted to ride either on the surface of rails 7 and 9 or in the various recesses 49, 51, 77 and 79. In particular, the end 91 of pin 65 engages the bottom of recess 49 and the surface of the rail 7 adjacent ramp 51; the end 93 of pin 65 engages the bottom of recess 77 and the surface of rail 9 adjacent ramp 83; the end 95 of pin 67 engages the bottom of recess 51 and the surface of rail 7 adjacent curved end portion 63; and the end 97 of pin 67 engages the bottom of recess 79 and the surface of rail 9 adjacent curved end portion 87.

The forward ends of rails 7 and 9 are slotted as indicated at 99 and 101, respectively. Opposite ends 103 and 105 of a link 106 extend through slots 99 and 101 and are pivotally connected to rails 7 and 9 by pins 107 and 109. An actuating arm 111 is connected to the center of link 106. The arm is adapted to be connected to or may form part of a control lever adapted to be operated by the driver of the vehicle. The arm 111 is adapted to move the link 106 forwardly or rearwardly of the transfer case, i.e. upwardly or downwardly as viewed in FIG. 2. Although link 106 is pivotally moved about pins 107 and 109 during forward movement of the link, the arm 111 at all times travels in a generally straight line path, and does not have to be moved into two different planes to accomplish shifting between neutral, high and low ranges.

Rail 9 is longer than rail 7 and the slotted portion of rail 9 extends forwardly beyond link 106. Secured to the forward end of rail 9 in slot 101, as by welding for example, is an arm 113 which extends away from rail 9 at a right angle. The rearward edge of arm 113 is adapted to abut the forward edge of link 106 when the latter extends at a right angle from the rail 9. As will be made apparent during a description of the operation of this device, the arm 113, when a rearwardly directed force is applied by arm 111 to link 106, prevents rearward movement of rail 9 from the FIG. 2 position unless rail 7 is moved rearwardly. A cutout portion or notch 115 in link 106 allows the rail 9 to be moved forwardly from the FIG. 2 position while rail 7 remains in the FIG. 2 position. Arm 113 and interlock pin 67 also prevent movement of rail 7 forwardly from the FIG. 2 position unless rail 9 is moved forwardly from the FIG. 2 position.

Assuming the control device of this invention is in the neutral position, i.e., the position shown in FIG. 2, operation is as follows:

In the neutral position, the end 95 of interlock pin 67 extends into the curved end portion 63 of recess 51, while the other end 97 engages the surface of rail 9. Since the pin 67 cannot move to the left as viewed in FIG. 2, the front wheel rail 7 cannot be moved forwardly into the high speed range shown in FIG. 5. However, the rear wheel rail 9 is not blocked against forward movement by either pin 65 or 67. Accordingly, a forwardly directed force on arm 111 causes link 106 to pivot clockwise about pin 107, thus moving rear wheel rail 9 and yoke 5 forwardly to the rear wheel high drive range position shown in FIG. 4. As the rear wheel rail 9 moves forwardly, the end 93 of interlock pin 65 slides along the surface of rail 9. Recess 79 is moved forwardly until it is aligned with the end 97 of interlock pin 67. The detent 75 is forced out of notch 69 and is biased into notch 71 to give the operator a feel that the transmission has been shifted into two wheel high range position.

If the operator wishes to place the vehicle in the four wheel high range drive condition, he applies a forwardly directed force again to arm 111. This causes link 106 to pivot counterclockwise about pin 109 and move rail 7 forwardly. As the rail 7 moves forwardly, the end 91 of interlock pin 65 slides along the bottom of the flat portion 53 of recess 49 to the curved end portion 55. The interlock pin 67 is cammed to the left as viewed in FIG. 4 by the curved end portion 63 of recess 51, thereby moving the end 97 of the pin into recess 79 as shown in FIG. 5.

Movement of the rails 7 and 9 back to neutral position is accomplished in a reverse manner to that described above. Upon the application of a rearwardly directed force to arm 111, the link 106 swings clockwise about pin 109 since the end 97 of pin 67 prevents rearward movement of rear wheel rail 9. The front wheel rail 7, however, is not blocked against rearward movement and is moved back to the FIG. 4 neutral position. In such position, the end 95 of pin 67 can move into recess 51, and the application of a rearwardly directed force to arm 111 causes link 106 to swing counterclockwise about pin 107, thus moving rear wheel rail 9 back to the FIG. 2 position.

As set forth above, the device of this invention prevents the transmission from being shifted into a two wheel (rear wheels) low range position, i.e. if it is desired to shift into low range, such range can be accomplished only in a four wheel drive condition. Thus, in the neutral position, front wheel rail 7 is blocked against rearward movement, by the engagement of end 91 of interlock pin 65 with ramp 57, unless the pin 65 can be moved to the left. Unless the rear wheel rail 9 is moved rearwardly, i.e. downwardly as viewed in FIG. 2, the engagement of end 93 of pin 65 with the surface of ramp 83 prevents leftward movement of pin 65. While rear wheel rail 9 is not blocked against rearward movement by pins 65 and 67 it cannot be moved rearwardly independently of front wheel rail 7 because the engagement of arm 113 with link 106 prevents such movement, i.e. link 106 cannot be pivoted in one direction beyond a predetermined position relative to rail 9. The arms 113 causes link 106 and consequently front wheel rail 7 to form a rigid relationship relative to rear wheel rail 9 and move with such rail. Such movement of the rails is permitted by the relationship between ramps 83 and 57 of recess 77 and 49. The ramp 57 cams the pin 65 to the left and such movement of pin 65 is permitted by the rearward movement of ramp 83. When the four wheel low range position is attained, detents 43 and 75 are located in recesses 73 and 45, the end 93 of pin 65 is seated in curved end portion 81 and the end 91 is engaging the surface of rail 7 adjacent ramp 57, thereby preventing further rearward movement of rail 9, and the end 95 of pin 67 is seated in curved end portion 61 of recess 51, thereby preventing further rearward movement of rail 7.

The rails 7 and 9 are moved together from the low range position shown in FIG. 6 back to neutral position. Front wheel rail 7 is not blocked against forward movement by pins 65 and 67. Rear wheel rail 9 is essentially locked against forward movement by the relationship between the end 93 of pin 65 and the ramp 83 of recess 77. However, the arm 113, due to its relationship with link 106, prevents substantial forward movement of front wheel rail 7 unless rear wheel rail 9 is also moved forwardly, i.e. arm 113 substantially rigidifies the structure formed by rails 7 and 9 and link 106. The ramp 83 of recess 77 forces the pin 65 to the right, which movement is permitted by the inclined ramp 51 of recess 49. Thus, the rails 7 and 9 are moved together back to the FIG. 2 position.

It will thus be seen that the apparatus prevents the occurrence of a two wheel low range condition.

In view of the foregoing, it will be noted that the several objects and other advantages are achieved.

Although only one embodiment of the invention has been disclosed and described, it is apparent that other embodiments and modifications of the invention are possible.

I claim:

1. A control device for a transmission mechanism comprising a first rail and a second rail, means supporting said rails for sliding movement, each rail being movable in one direction from a first position to a second position and movable in an opposite direction from said first position to a third position, interlock means for permitting movement of one of said rails from said first position to said second position only after the other rail is moved from said first position to said second position, and for permitting movement of both of said rails at the same time from said first position to said third position, link means connected to said rails, actuating means for applying a force to said link means along a generally straight line path in said first direction for moving said rails from said first position to said second position and in said opposite direction for moving said rails from said first postion to said third position, and means engageable with said link means for causing movement of both said rails together from said first position to said third position when the force applied by said actuating means is directed in said opposite direction along said generally straight line path.

2. A control device as set forth in claim 1 wherein said means engageable with said link means comprises an arm connected to one of said rails and extending adjacent said link means, said link means being pivotally connected to said rails, said arm preventing pivotal movement of said link means in one direction beyond a predetermined position relative to said one rail.

3. A control device as set forth in claim 1 wherein said interlock means includes first and second interlock pins extending between said rails, a first recess in said one rail into which one end of said first interlock pin is adapted to be moved, a second recess in said one rail into which one end of said second interlock pin is adapted to be moved, a third recess in said other rail into which the other end of said first interlock pin is adapted to be moved, a fourth recess in said other rail into which the other end of said second interlock pin is adapted to be moved.

4. A control device as set forth in claim 3 wherein said means engageable with said link means comprises an arm connected to one of said rails and extending adjacent said link means, said link means being pivotally connected to said rails, said arm preventing pivotal movement of said link means in one direction beyond a predetermined position relative to said one rail.

5. A control device as set forth in claim 3 wherein said first recess has a generally straight portion and a generally inclined portion adjacent said generally straight portion, said third recess having a generally inclined portion extending generally parallel to the generally inclined portion of said first recess, said first interlock pin moving out of said first recess and into said third recess along said inclined portions when said rails are moved from their first to their third positions.

6. A control device as set forth in claim 5 wherein said second recess includes a generally straight portion, said one end of said second interlock pin being moved, relative to said one rail, from one end of said second recess to the other end of said second recess when said one rail is moved from its first position to its third position, said second interlock pin moving out of said second recess and into said fourth recess when said one rail is moved from its first position to its second position.

7. A control device as set forth in claim 5 wherein said means engageable with said link means comprises an arm connected to one of said rails and extending adjacent said link means, said link means being pivotally connected to said rails, said arm preventing pivotal movement of said link means in one direction beyond a predetermined position relative to said one rail.

8. A control device for a transmission mechanism comprising a first rail and a second rail, means supporting said rails for sliding movement, each rail being movable in one direction from a first position to a second position and movable in an opposite direction from said first position to a third position, each of said rails having a plurality of elongated recesses therein, a pair of interlock pins extending between said rails, one pin being adapted for movement into one recess on one rail and one recess on the other rail, the other pin being adapted for movement into a second recess on said one rail and a second recess on said other rail, a link joining one end of one rail to one end of the other rail, and means connected to one of said rails for causing movement of said first rail in said opposite direction from said first position to said third position when said second rail is moved from said first position to said third position, said interlock pins allowing both of said rails to be moved together from said first position to said third position.

9. A control device as set forth in claim 8 wherein said means connected to one of said rails comprises an arm extending adjacent said link for preventing movement of said link in one direction beyond a predetermined position relative to the rail to which said arm is connected.

10. A control device as set forth in claim 9 wherein said one recess in said one rail has a generally straight portion and a generally inclined portion adjacent said generally straight portion, said one recess in said other rail having a generally inclined portion extending generally parallel to the generally inclined portion of said one recess in said one rail, said one pin moving out of said one recess in said one rail and into said one recess in said other rail when said rails are moved from said first position to said third position.

11. A control device for a transmission mechanism comprising a first rail and a second rail, housing means for supporting said rails for sliding movement, link means extending between said rails, actuating means for applying forces to said link means to move said rails into and out of said housing means, and means connected to one of said rails and engageable with said link means to cause said rails to move together in one direction when a force is applied to said link means in said one direction by said actuating means.

12. A control device as set forth in claim 11 wherein said means connected to one of said rails comprises an arm extending adjacent said link means.

References Cited

UNITED STATES PATENTS 3,283,298   11/1966   Kaiser _____ 74—477 X
3,354,741   11/1967   Johnston et al. _____ 74—477

MILTON KAUFMAN, Primary Examiner

U.S. Cl. X.R.

180—44